(12) United States Patent
Samo (10) Patent No.: US 8,294,998 B1
(45) Date of Patent: Oct. 23, 2012

(54) MAGNIFICATION SYSTEMS

(76) Inventor: Zuhair K. Samo, Yuma, AZ (US)

( * ) Notice: Subject to any disclaimer, the term of this patent is extended or adjusted under 35 U.S.C. 154(b) by 204 days.

(21) Appl. No.: 12/832,951

(22) Filed: Jul. 8, 2010

Related U.S. Application Data (60) Provisional application No. 61/224,989, filed on Jul. 13, 2009.

(51) Int. Cl.
*G02B 27/02* (2006.01)

(52) U.S. Cl. ........................................ 359/802

(58) Field of Classification Search .................. 359/802, 359/822, 817, 818
See application file for complete search history.

(56) References Cited

U.S. PATENT DOCUMENTS

| | | |
|---|---|---|
| 3,955,884 A | 5/1976 | Del Pesco, Sr. |
| 4,712,870 A | 12/1987 | Robinson et al. |
| 4,796,162 A | 1/1989 | Krogsrud |
| 5,048,928 A | 9/1991 | Davis |
| 5,847,883 A * | 12/1998 | Rispoli, Sr. ............... 359/802 |
| 6,086,228 A * | 7/2000 | McGowan et al. ......... 362/396 |
| 6,088,173 A | 7/2000 | Mendelsohn et al. |
| 6,417,894 B1 | 7/2002 | Goff et al. |
| 6,989,948 B2 | 1/2006 | Hussaini et al. |
| 7,495,846 B1 | 2/2009 | Kappel |
| 7,548,386 B2 | 6/2009 | Huang |

* cited by examiner

*Primary Examiner* — Joseph P Martinez
(74) *Attorney, Agent, or Firm* — Stoneman Law Patent Group; Martin L. Stoneman; Kyle Liudahl (57) ABSTRACT

A system to support at least one magnification device on a readable digital display screen upon a base that is interchangeable with a clamp, and that is further capable of omnidirectionally orienting the supported magnification device about at least two axes.

16 Claims, 6 Drawing Sheets

MAGNIFICATION SYSTEMS

CROSS REFERENCE TO RELATED APPLICATION

The present application is related to and claims priority from prior provisional application Ser. No. 61/224,989, filed Jul. 13, 2009, entitled "FLEXIBLE LCD MAGNIFICATION SYSTEM WITH CONVERSION BASE ATTACHMENT FOR TABLE TOP LIGHTED LAMP MAGNIFIER," the contents of which is incorporated herein by this reference and are not admitted to be prior art with respect to the present invention by the mention in this cross-reference section.

BACKGROUND

This invention relates to providing a system of interchangeably supportable and omni-directionally positional magnification devices. More particularly, this invention relates to providing a system to support a magnification device on a readable digital display screen upon a base that is interchangeable with a clamp, and that is further capable of omni-directionally orienting the supported magnification device about at least two axes.

There is sometimes a need to magnify screen images supported by objects with varying shapes and sizes. Sometimes the images are located upon flat rigid objects, such as LCD monitors or digital books. Other times, the images are located upon less rigid objects such as photos or the pages of a book. Attaching a magnification system to a flat rigid object, such as an LCD monitor, is a problem when used with objects possessing different geometries. Likewise, if a person desires a magnifier supported by a base, that may be inconvenient for objects whose geometries consume a great deal of space, such as LCD monitors.

There may also be a problem when the geometries of an apparatus supporting a lens do not allow for proper orienting of the lens about the two axes defining a plane normal to a user's line of sight. If not properly oriented relative to a user's line of sight, a lens cannot fully perform its magnification function. Such problems may be even greater when such a user suffers from visual impairments and may depend upon the proper functioning of the magnifier for his or her ability to read.

A need exists for a magnification system that is interchangeably supportable by clamps and bases onto objects with varying shapes and sizes. A need exists for a magnification system that allows its lens to be user-oriented about at least two axes.

OBJECTS AND FEATURES OF THE INVENTION

A primary object and feature of the present invention is to provide a system overcoming the above-mentioned problem(s).

It is a further object and feature of the present invention to provide a system for interchangeably supporting a magnification device upon either a base or clamp, depending upon the circumstances and user preferences.

It is a further object and feature of the present invention to provide a system capable of omni-directionally orienting a supported magnification device about at least two axes defining a plane perpendicular to a user's line of sight.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a magnifying system comprising: at least one magnifier lens structured and arranged to magnify at least one image upon at least one LCD monitor; at least one omni-directional lens positioner structured and arranged to position such lens in at least one orientation rotatable about at least two axes; at least one articulating arm structured and arranged to support such omni-directional lens positioner at one or more locations; and at least one interchangeable support structured and arranged to support such articulating arm; wherein such magnifier lens is supported in an upright position by such interchangeable support. Moreover, it provides such a magnifying system of claim 1 wherein: such lens comprises at least one width no less than 10¼ inches, at least one height no less than 7¾ inches; and such omni-directional lens positioner comprises at least one lens holder, at least one omni-directional joint; wherein such omni-directional joint movably connects such lens holder to such articulating arm; and wherein such omni-directional joint assists such lens holder in rotating about at least two axes relative to such articulating arm.

Additionally, it provides such a magnifying system wherein such lens holder comprises: at least one shaft; wherein such shaft is rigidly and permanently connected to such at least one magnifier lens. Also, it provides such a magnifying system wherein such lens holder comprises: at least one shaft; and at least one lens compartment; wherein such shaft is rigidly and permanently connected to such lens compartment; and wherein such lens compartment is structured and arranged to interchangeably receive and hold assorted lenses. In addition, it provides such a magnifying system wherein such at least one lens holder comprises: at least one shaft; at least one lens compartment; and at least one second clamp; wherein such at least one shaft is structured and arranged to rigidly removably connect with such at least one second clamp; wherein such at least one second clamp is structured and arranged to rigidly removably connect with such at least one lens compartment; wherein such at least one lens compartment is structured and arranged to interchangeably receive and hold exactly one magnifier lens at a time; and wherein such at least one magnifier lens is selected from at least one assortment of magnifier lenses.

And, it provides such a magnifying system wherein such omni-directional joint comprises exactly one ball joint. Further, it provides such a magnifying system wherein such omni-directional joint comprises exactly one universal joint. Even further, it provides such a magnifying system wherein such interchangeable support comprises: at least one first clamp; wherein such first clamp is structured and arranged to removably connect with such articulating arm in a substantially rigid manner; wherein such first clamp is structured and arranged to removably connect with exactly one edge of exactly one LCD monitor; and wherein such first clamp is structured and arranged to support such magnifying system upon such edge of such LCD monitor.

Moreover, it provides such a magnifying system wherein such interchangeable support comprises: at least one base; wherein such at least one base is structured and arranged to removably connect with such at least one articulating arm in a substantially rigid manner; wherein such at least one base comprises at least one bottom surface; and wherein such at least one bottom surface comprises at least one area sufficiently large to support such magnifier lens in a substantially upright position. Additionally, it provides such a magnifying system wherein such at least one articulating arm comprises: at least two straight arms; wherein each of such at least one straight arms is movably connected to at least one other straight arm by exactly one articulating joint; and wherein such articulating joint assists with at least one rotation about exactly one axis.

Also, it provides such a magnifying system wherein such articulating joint comprises: exactly one first crown gear comprising exactly one first axis of rotation and at least one first plurality of teeth; and exactly one second crown gear comprising exactly one second axis of rotation and at least one second plurality of teeth; wherein such first axis of rotation is coaxial with such second axis of rotation; wherein such first plurality of teeth of such first crown gear is structured and arranged to engage with such second plurality of teeth of such second crown gear; wherein at least one such straight arm is rigidly and radially connected to such first crown gear comprising at least one first rotatable arm; wherein at least one such straight arm is rigidly and radially connected to such second crown gear comprising at least one second rotatable arm; and wherein such first rotatable arm will rotate relative to such second rotatable arm about such first and second axes of rotation when provided a user selected amount of torque.

In addition, it provides such a magnifying system wherein such straight arms comprise telescoping arms further comprising: at least one proximal portion; at least one distal portion; and at least one telescoping joint; wherein such at least one proximal portion is coaxial to such at least one distal portion; and wherein such at least one proximal portion is movably connectable to such at least one distal portion by exactly one telescoping joint. And, it provides such a magnifying system wherein such arms comprise at least one lightweight plastic material.

In accordance with another preferred embodiment hereof, this invention provides a magnifying system comprising: at least one magnifier lens structured and arranged to magnify at least one image upon at least one LCD monitor wherein such at least one magnifier lens comprises at least one width no less than 10¼ inches, and at least one height no less than 7¾ inches; at least one omni-directional lens positioner structured and arranged to position such at least one magnifier lens in at least one orientation rotatable about at least two axes wherein such at least one omni-directional positioner comprises at least one lens holder, and at least one omni-directional joint; at least one articulating arm structured and arranged to movably support such at least one omni-directional lens positioner at one or more locations; and at least one interchangeable support structured and arranged to rigidly support such at least one articulating arm in a substantially upright position; wherein such at least one articulating arm comprises at least two straight arms, and at least one articulating joint, wherein such at least two straight arms are movably connected to each other by such at least one articulating joint; wherein each such at least one articulating joint assists with at least one rotation about exactly one axis; wherein such at least one omni-directional joint movably connects such at least one lens holder with such at least one articulating arm; and wherein such at least one omni-directional joint assists such at least one lens holder in rotating about at least two axes relative to such at least one articulating arm.

Further, it provides such a magnifying system wherein such at least one lens holder comprises: at least one shaft; at least one lens compartment; wherein such at least one shaft is rigidly and permanently connected to such at least one lens compartment; and wherein such at least one lens compartment is structured and arranged to interchangeably receive and hold exactly one magnifier lens. Even further, it provides such a magnifying system wherein such lens holder comprises: at least one shaft; at least one lens compartment; at least one second clamp; wherein such at least one shaft is structured and arranged to rigidly removably connect with such second clamp; wherein such second clamp is structured and arranged to rigidly removably connect with such lens compartment; and wherein such at least one lens compartment is structured and arranged to interchangeably receive and hold exactly one magnifier lens.

Even further, it provides such a magnifying system wherein such at least one interchangeable support comprises: at least one first clamp; wherein such at least one first clamp is structured and arranged to removably connect with such at least one articulating arm in a substantially rigid manner; wherein such at least one first clamp is structured and arranged to removably connect with exactly one edge of exactly one LCD monitor; and, wherein such at least one first clamp is structured and arranged to support such at least one magnifier lens upon such edge of such LCD monitor. Even further, it provides such a magnifying system wherein such at least one interchangeable support comprises: at least one base; wherein such at least one base is structured and arranged to removably connect with such at least one articulating arm in a substantially rigid manner; wherein such at least one base comprises at least one bottom surface; and wherein such at least one bottom surface comprises at least one area sufficiently large to support such at least one magnifier lens in a substantially upright position.

Even further, it provides such a magnifying system wherein such at least one articulating joint comprises: exactly one first crown gear comprising exactly one first axis of rotation and at least one first plurality of teeth; and exactly one second crown gear comprising exactly one second axis of rotation and at least one second plurality of teeth; wherein such first axis of rotation is coaxial with such second axis of rotation; wherein such first plurality of teeth of such first crown gear is structured and arranged to engage with such second plurality of teeth of such second crown gear; wherein at least one straight arm is rigidly and radially connected to such first crown gear comprising at least one first rotatable arm; wherein at least one of such at least two straight arms is rigidly and radially connected to such second crown gear comprising at least one second rotatable arm; and wherein such at least one first rotatable arm will rotate relative to such at least one second rotatable arm about such first and second axes of rotation when provided a user-selected amount of torque.

Even further, it provides such a magnifying system wherein such straight arms comprise telescoping arms further comprising: at least one proximal portion; at least one distal portion; and at least one telescoping joint; wherein such at least one proximal portion is coaxial to such at least one distal portion; and, wherein such at least one proximal portion is movably connectable to such at least one distal portion by exactly one telescoping joint.

In accordance with another preferred embodiment hereof, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
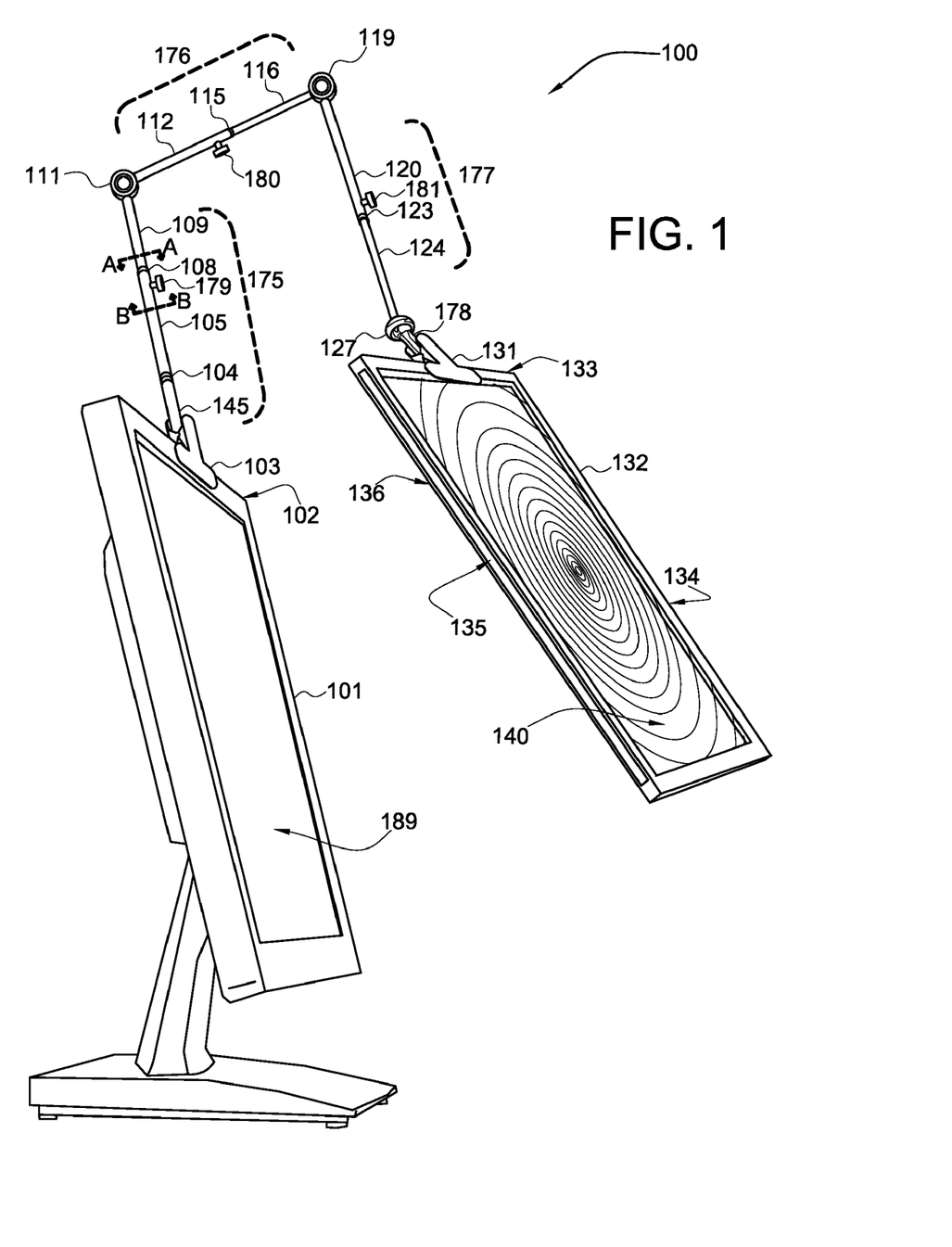
FIG. 1 shows a perspective view of a magnifier of the magnifying systems, illustrating the magnifier supported by a support clamp attached to an LCD monitor, according to a preferred embodiment of the present invention.

FIG. 1 shows a perspective view of a magnifier 100 of the magnifying systems 200, illustrating the magnifier supported by a clamp 103 attached to an LCD monitor 101, according to a preferred embodiment of the present invention.

Magnifier 100 preferably comprises at least one first telescoping arm 175, preferably at least one second telescoping arm 176, preferably at least one third telescoping arm 177, preferably at least one first articulating joint 111, preferably at least one second articulating joint 119, preferably at least one omni-directional positioner such as ball joint 127, preferably at least one lens compartment 132 and preferably at least one lens 140, as shown.

First telescoping arm 175, second telescoping arm 176 and third telescoping arm 177 preferably comprise lightweight plastics materials and are preferably cylindrical or tubular in shape. Each telescoping arm preferably comprises a total length of 10 inches when fully retracted, and preferably a total length of 20 inches when fully extended.

First telescoping arm 175 preferably is movably connected to second telescoping arm 176 preferably by means of first articulating joint 111, which preferably assists second telescoping arm 176 to rotate relative to first telescoping arm 175. Second telescoping arm 176 preferably is movably connected to third telescoping arm 177 preferably by means of second articulating joint 119, which preferably assists third telescoping arm 177 to rotate relative to second telescoping arm 176, as shown. The above-described arrangement at least herein embodies wherein said arms are movably connected to each other by at least one articulating joint.

Third telescoping arm 177 is preferably movably connected to lens compartment 132 preferably by means of at least one omni-directional positioner such as, preferably ball joint 127, which preferably assists lens compartment 132 to rotate relative to third telescoping arm 177. The articulations of such telescoping arms about the articulating joints preferably assist in supporting the omni-directional positioner at any point in space that is within the reach of all the telescoping arms. The above-described arrangement at least herein embodies at least herein embodying at least one articulating arm structured and arranged to support said omni-directional lens positioner at one or more locations.

The omni-directional positioner preferably comprises distal shaft 178, which preferably is removably and rigidly connected to lens compartment 132 by second clamp 131. The above-described arrangement at least herein embodies wherein said second clamp is structured and arranged to rigidly but removably connected with said lens compartment. Lens 140 is preferably removably contained within lens compartment 132.

First telescoping arm 175 preferably comprises at least one attachment arm 173, preferably at least one rotating joint 104, preferably at least one first arm 105, preferably at least one first telescopic joint 108, and preferably at least one second arm 109, as shown. Attachment arm 173 is preferably movably connected to first arm 105 preferably by means of rotating joint 104, which preferably assists first arm 105 to rotate relative to attachment arm 173. Second arm 109 is preferably movably connected to first arm 105 preferably by means of first telescopic joint 108, which preferably assists second arm 109 to move translationally relative to first arm 105.

Rotating joint 104 preferably assists first arm 105 in rotating relative to attachment arm 173 preferably about their shared longitudinal axis. Rotating joint 104 preferably provides first arm 105 with one degree of freedom relative to attachment arm 173 comprising first rotation 107 (shown in FIG. 4).

Second telescoping arm 176 preferably comprises at least one third arm 112, preferably at least one second telescopic joint 115 and preferably at least one fourth arm 116, as shown. Fourth arm 116 is preferably movably connected to third arm 112 preferably by means of second telescopic joint 115, which preferably assists fourth arm 116 to move translationally relative to third arm 112.

Third telescoping arm 177 preferably comprises at least one fifth arm 120, preferably at least one third telescopic joint 123 and preferably at least one sixth arm 124, as shown. Fifth arm 120 is preferably movably connected to sixth arm 124 preferably by means of third telescopic joint 123, which preferably assists sixth arm 124 to move translationally relative to fifth arm 120.

LCD monitor 101 preferably comprises at least one monitor top edge 102. In a preferred embodiment, first telescoping arm 175 is preferably removably attached to preferably to top edge 102 of LCD monitor 101 preferably by means of at least one first clamp 103, as shown. The above-described arrangement at least herein embodies wherein said first clamp is structured and arranged to support said magnifying system upon said edge of said LCD monitor. Monitor top edge 102 preferably may be inserted into first clamp 103 to form preferably a temporary but rigid connection preferably between monitor top edge 102 and first telescoping arm 175, as shown. The above-described arrangement at least herein embodies wherein said first clamp is structured and arranged to removably connect with exactly one edge of exactly one LCD monitor.

In a preferred embodiment of the present invention, omni-directional positioner preferably comprises ball joint 127 which preferably removably connects to lens compartment 132 preferably by means of at least one second clamp 131, as shown. Ball joint 127 preferably comprises at least one distal shaft 178, which preferably rotates freely about ball joint 127 preferably about exactly three axes. Lens compartment 132 preferably may be inserted into second clamp 131 preferably to form a temporary but rigid connection preferably between lens compartment 132 and distal shaft 178, as shown. When lens compartment 132 is connected to distal shaft 178, and lens 140 is inserted within lens compartment 132, lens 140 preferably may be freely rotated about ball joint 127.

Figure 2A:
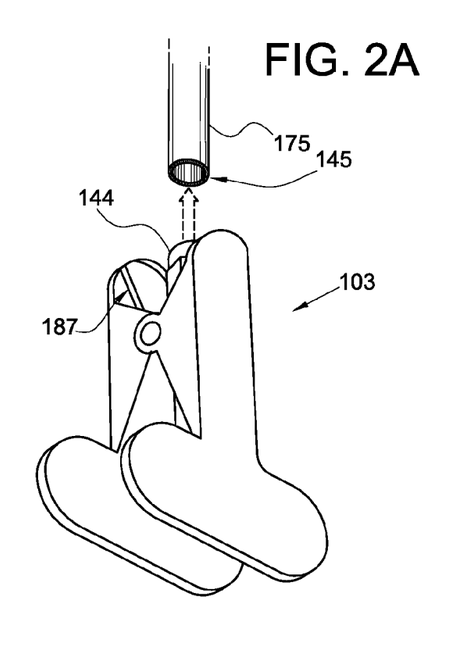
FIG. 2A shows a perspective view of the support clamp of FIG. 1, illustrating the magnifier being interchangeably removed from the support clamp, according to the preferred embodiment of FIG. 1.

FIG. 2A shows a perspective view of first clamp 103 of FIG. 1, illustrating magnifier 100 being interchangeably removed from first clamp 103, according to the preferred embodiment of FIG. 1. In at least one preferred embodiment, proximal end 145 of first telescoping arm 175 preferably may be removably attached to first clamp 103 preferably by means of at least one arm-clamp connector 144, as shown. Arm-clamp connector 144 preferably is permanently and rigidly connected to first clamp 103. Arm-clamp connector 144 preferably comprises at least one inner clamp bore 147 (shown in FIG. 2B). First telescoping arm 175 preferably comprises at least one proximal end 145 that preferably may be inserted into the inner clamp bore 147 of arm-clamp connector 144 preferably to form a temporary, preferably rigid, connection preferably between first telescoping arm 175 and first clamp 103, as shown. The above-described arrangement at least herein embodies wherein said first clamp is structured and arranged to removably connect with said articulating arm in a substantially rigid manner. Third telescoping arm 177 preferably may be removably attached to second clamp 131 in the same manner.

Likewise, third telescoping arm 177 preferably may be removably attached to second clamp 131 preferably by means of at least one arm-clamp connector 174. Second clamp 131 is preferably permanently and rigidly connected to arm-clamp connector 174. Arm-clamp connector 174 preferably comprises an inner clamp bore similar to inner clamp bore 147. Third telescoping arm 177 preferably comprises exactly one proximal end similar to proximal end 145 that preferably may be inserted into the inner clamp bore of arm-clamp connector 174 preferably to form a temporary but preferably rigid connection preferably between third telescoping arm 177 and second clamp 131. The above-described arrangement at least herein embodies wherein said shaft is structured and arranged to rigidly but removably connected with said second clamp.

Figure 2B:
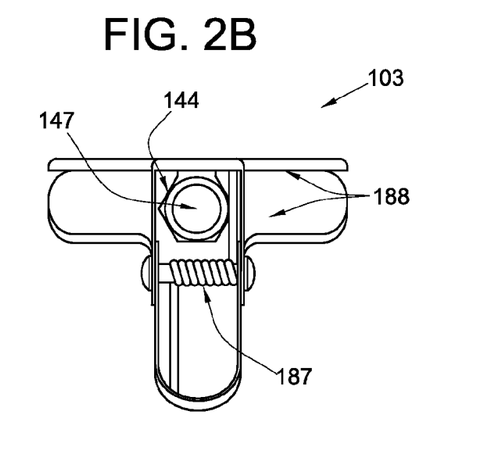
FIG. 2B shows a rear view of the support clamp of FIG. 1, illustrating the construction of the support clamp, according to the preferred embodiment of FIG. 1.

FIG. 2B shows a rear view of first clamp 103 of FIG. 1, illustrating the construction of first clamp 103, according to the preferred embodiment of FIG. 1. Clamp 103 is preferably urged into a closed position by torsion spring 187, as shown. Torsion spring 187 preferably comprises a spring force sufficient to support the entire weight of magnifier 100 in an upright position when clamped upon edge 102 of LCD monitor 101 (as shown in FIG. 1). The inner part of clamp 103 preferably is made or coated with a high impact rubber material 188 (shown in FIG. 2B) such that it will not scratch or damage edge 102 of LCD monitor 101 when clamped into position (as shown in FIG. 1).

Figure 3:
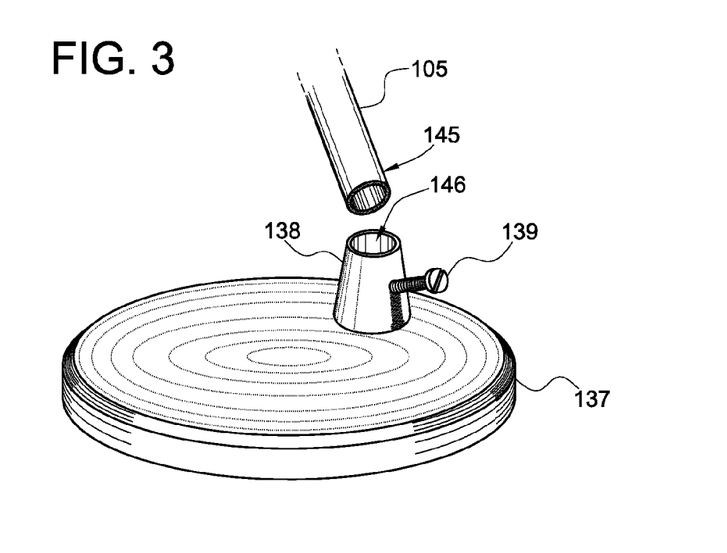
FIG. 3 shows a perspective view of a support base, illustrating an interchangeable support base for supporting the magnifier, according to another preferred embodiment of the present invention.

FIG. 3 shows a perspective view of base 137, illustrating an interchangeable support base for supporting magnifier 100, according to another preferred embodiment of the present invention. The proximal end 145 of first arm 105 of magnifier 100 preferably is interchangeably inserted within base connector 138, which is rigidly attached to base 137. This arrangement preferably forms a temporary, preferably rigid, connection between first arm 105 and base 137. The above-described arrangement at least herein embodies at least one interchangeable support structured and arranged to support said articulating arm. Base 137 preferably comprises at least one bottom surface and at least one base connector 138, which is preferably a frusto-conical attachment to base 137, as shown. The bottom surface preferably comprises at least one area sufficiently large to support such magnifying system in a substantially upright position, as shown (at least herein embodying wherein said bottom surface comprises at least one area sufficiently large to support said magnifying system in a substantially upright position). Base connector 138 preferably comprises at least one inner base bore 146. Magnifier 100 is preferably temporarily rigidly connected to base 137 preferably by inserting proximal end 145 of first arm 105 within inner base bore 146 of base connector 138, as shown. Preferably, at least one screw 139 is preferably "tightened" with clockwise rotations until first arm 105 is firmly locked within inner base bore 146.

Figure 4:
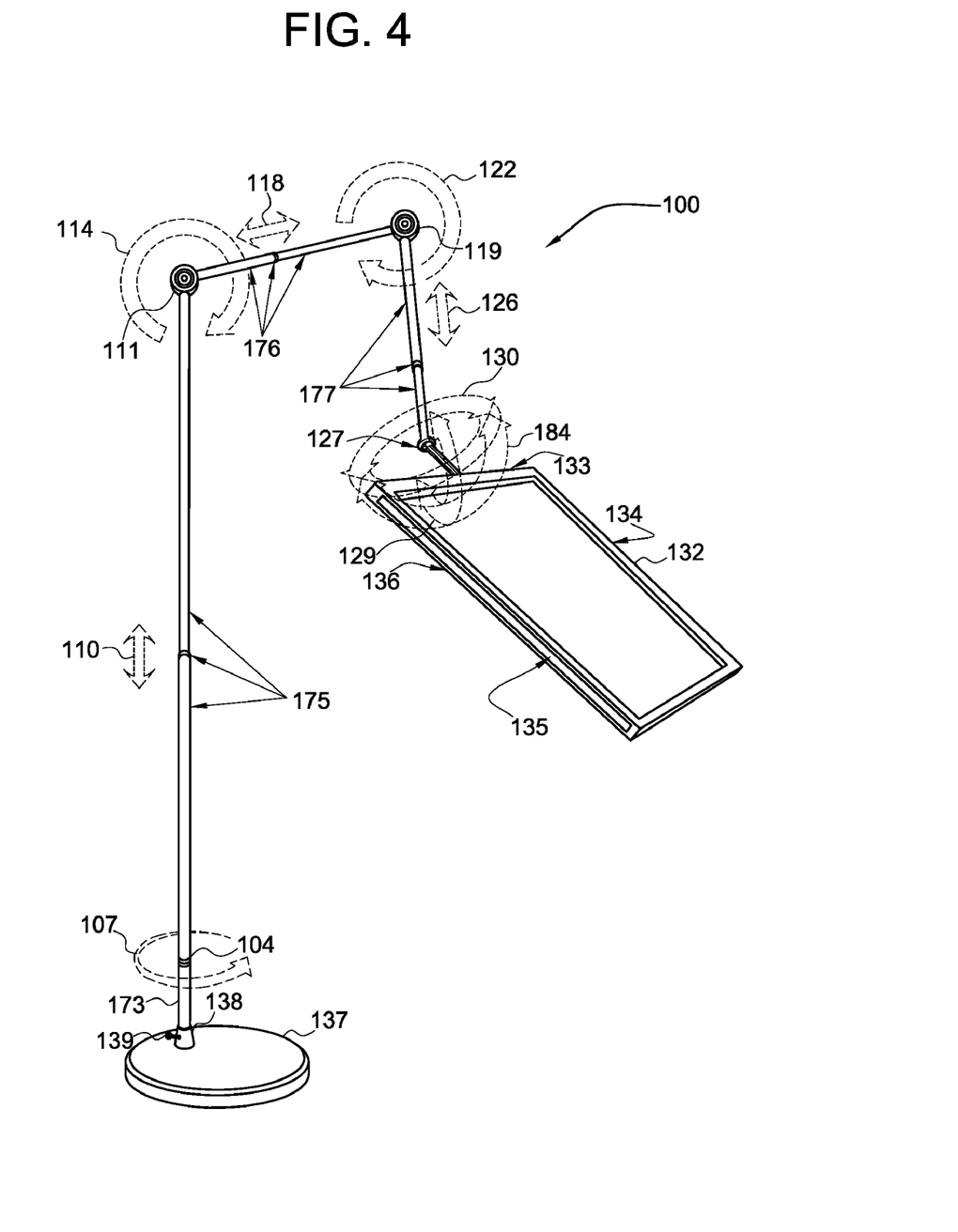
FIG. 4 shows a perspective view of the magnifier, illustrating the kinematics of the magnifier after the attachment arm has been inserted within the base of FIG. 3 according to a preferred embodiment of the present invention.

FIG. 4 shows a perspective view of magnifier 100, illustrating the kinematics of magnifier 100 after attachment arm 173 has been inserted within base 137 of FIG. 3 according to a preferred embodiment of the present invention. Magnifier 100 preferably is supported by base 137, and will support itself upon any relatively flat surface. The above-described arrangement at least herein embodies wherein said magnifying system is supported in an upright position by said interchangeable support.

The kinematics of magnifier 100 are illustrated by the motions of said omni-directional positioner, telescoping arms and articulating joints. The omni-directional positioner preferably comprises ball joint 127, as shown. The omni-directional positioner preferably assists with rotations about at least two axes (such as when said omni-directional positioner is embodied by at least one universal joint), and more preferably assists rotation about exactly three axes comprising second rotation 129, third articulation 130 and fourth articulation 184. The above-described arrangement at least herein embodies at least one omni-directional lens positioner structured and arranged to position said lens in at least one orientation rotatable about at least two axes.

The telescoping arms preferably comprise three telescoping arms: first telescoping arm 175, second telescoping arm 176 and third telescoping arm 177. Alternately preferably, telescoping arms may be non-telescoping straight arms (at least herein embodying at least two straight arms). Such telescoping arms preferably assist with translational motion preferably along exactly three longitudinal axes preferably comprising first translation 110, second translation 118 and third translation 126. Rotational joint 104, first articulating joint 111 and second articulating joint 119 each preferably assist such telescoping arms with rotational motion about exactly one axis respectively comprising first rotation 107, first articulation 114 and second articulation 122. The above-described arrangement at least herein embodies wherein each said articulating joint assists with at least one rotation about exactly one axis. Upon reading this specification, those with ordinary skill in the art will now appreciate that, under appropriate circumstances, considering such issues as design preference, user preferences, marketing preferences, cost, structural requirements, available materials, technological advances, etc., other arm arrangements such as, for example, non-telescoping arms, straight arms, more than one arm, etc., may suffice.

Figure 5:
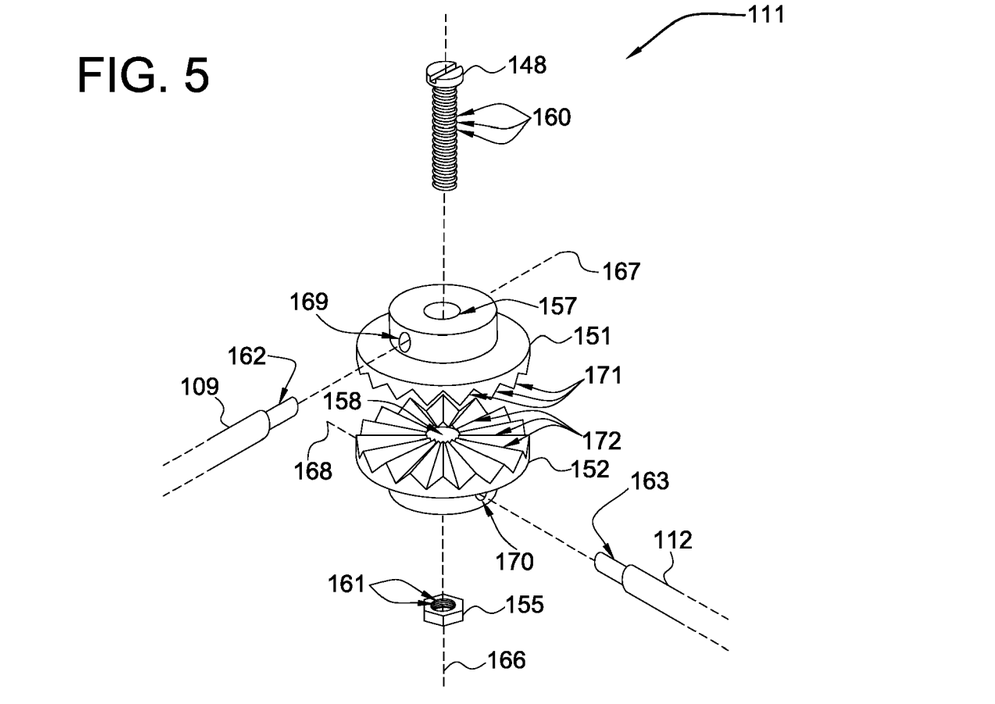
FIG. 5 shows an exploded view of an articulating joint, illustrating the assembly of the articulating joint, according to the preferred embodiment of FIG. 4.

FIG. 5 shows an exploded view of articulating joint 111, illustrating the assembly of articulating joint 111, according to the preferred embodiment of FIG. 4. First articulating joint 111 preferably comprises at least one first crown gear 151, at least one second crown gear 152, at least one machine screw 148 and at least one hex nut 155, as shown. First crown gear 151 preferably comprises at least one first crown axial bore 157, at least one first crown radial bore 169 and at least one first set of teeth 171, as shown. The above-described arrangement at least herein embodies exactly one first crown gear comprising exactly one first axis of rotation and at least one first plurality of teeth.

Second crown gear 152 preferably comprises at least one second crown axial bore 158, at least one second crown radial bore 170 and at least one second set of teeth 172, as shown. The above-described arrangement at least herein embodies exactly one second crown gear comprising exactly one second axis of rotation and at least one second plurality of teeth.

Second arm 109 is preferably rigidly affixed to first crown gear 151 preferably by inserting proximal end 162 of second arm 109 within first crown radial bore 169 preferably along at least one first radial axis 167, as shown. The above-described arrangement at least herein embodies exactly one first arm rigidly radially connected with said first crown gear. First radial axis 167 is preferably perpendicular to at least one axis of rotation 166, as shown.

Third arm 112 is preferably rigidly affixed to second crown gear 152 preferably by inserting proximal end 163 of third arm 112 within second crown radial bore 170 preferably along at least one second radial axis 168, as shown. The above-described arrangement at least herein embodies exactly one second arm rigidly radially connected with said second crown gear.

Second radial axis 168 is preferably perpendicular to axis of rotation 166, as shown. First set of teeth 171 preferably are gently urged into engagement with second set of teeth 172 preferably by means of machine screw 148 and hex nut 155, as shown. Machine screw 148 is preferably inserted through first crown axial bore 157 and preferably protrudes from second crown axial bore 158 preferably along axis of rotation 166, as shown. The above-described arrangement at least herein embodies wherein said first axis of rotation is coaxial with said second axis of rotation. Hex nut 155 is preferably affixed to the protruding end of machine screw 148 and preferably tightened until the first set of teeth 171 are engaged with second set of teeth 172, as shown. The above-described arrangement at least herein embodies wherein said first plurality of teeth of said first crown gear is structured and arranged to engage with said second plurality of teeth of said second crown gear.

Upon reading this specification, those with ordinary skill in the art will now appreciate that, under appropriate circumstances, considering such issues as design preference, user preferences, marketing preferences, cost, structural requirements, available materials, technological advances, etc., other joint arrangements such as, for example, other articulating joints, such as hinge joints, barrel hinges, ball and socket joints, universal joints, etc., may suffice.

Figure 6:
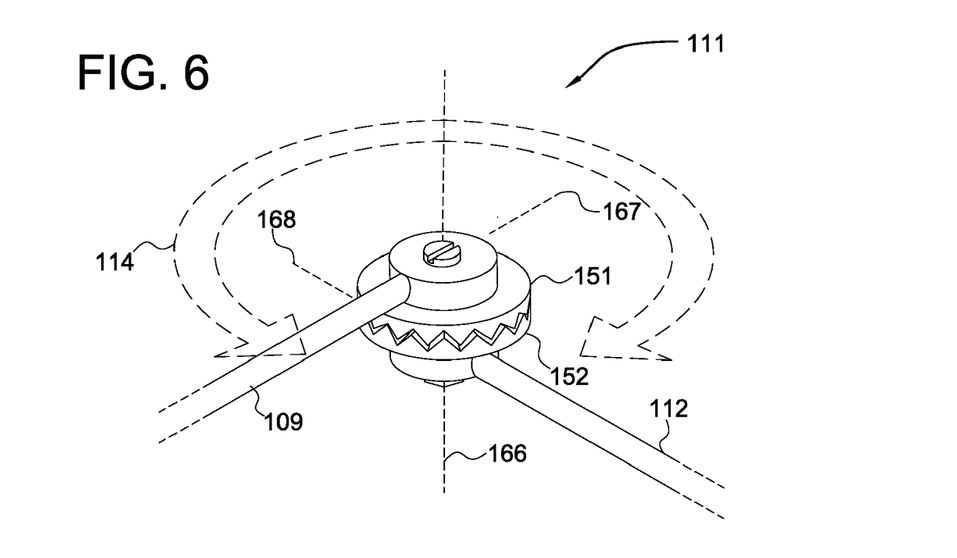
FIG. 6 shows a perspective view of an articulating joint, illustrating the rotation of the arms about the articulating joint, according to the preferred embodiment of FIG. 4.

FIG. 6 shows a perspective view of articulating joint 108, illustrating first articulation 114 of second arm 109 and third arm 112 about axis of rotation 166, according to the preferred embodiment of FIG. 4. Third arm 112 and second arm 109 preferably may be rotated about axis of rotation 166 relative to each other if subjected to a user applied force. Preferably, the amount of force required to cause rotation may be altered by a user. By tightening and loosening hex nut 155, a user preferably may adjust the amount of force required to cause rotation to a user desired level. The above-described arrangement at least herein embodies wherein said first arm will rotate relative to said second arm about said first and second axes of rotation when provided a user selected amount of torque. The ability of third arm 112 to rotate about axis of rotation 166 relative to second arm 109 preferably provides third arm 112 with at least one single degree of freedom comprising first articulation 114, as shown.

Second articulating joint 119 is preferably similarly constructed preferably assisting second telescoping arm 176 to rotate relative to third telescoping arm 177. Preferably, the ability of third telescoping arm 177 to rotate relative to second telescoping arm 176 preferably provides third telescoping arm 177 with a single degree of freedom comprising at least one second articulation 122.

Figure 7:
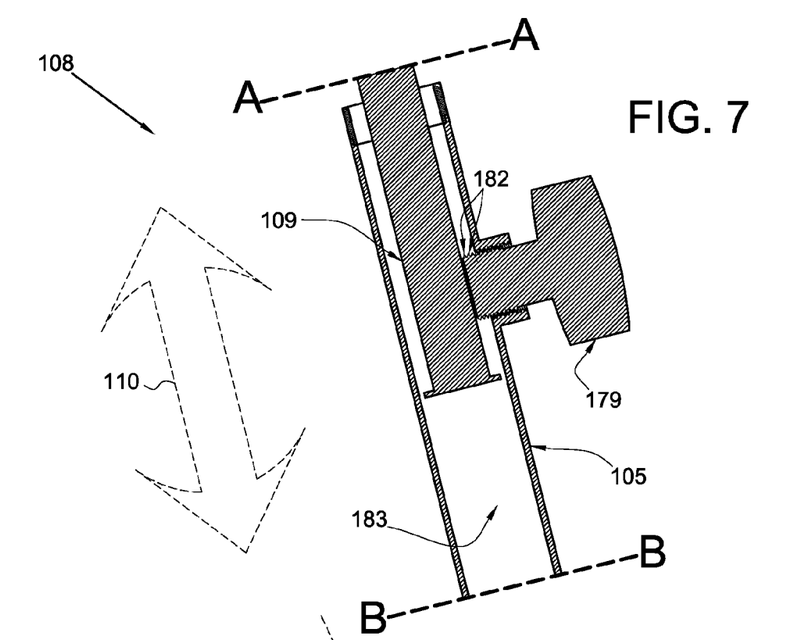
FIG. 7 shows a cross-sectional view of a telescoping joint, illustrating the mechanisms of the telescoping joint, according to the preferred embodiment of FIG. 4.

FIG. 7 shows cross-sectional view of telescoping joint 108, illustrating the mechanisms of the telescoping joint, according to the preferred embodiment of FIG. 4. First telescopic joint 108 preferably comprises first arm 105 (at least herein embodying at least one distal portion), second arm 109 (at least herein embodying at least one proximal portion) and at least one first handle 179, as shown. First arm 105 preferably comprises at least one inner bore 183. First arm 105 and second arm 109 share a common longitudinal axis (at least herein embodying herein said proximal portion is coaxial to said distal portion).

At least one end of second arm 109 is preferably located within inner bore 183, as shown. The length of first telescoping arm 175 is preferably contracted by sliding second arm 109 further inside inner bore 183. Conversely, the length of first telescoping arm 175 is preferably expanded by sliding second arm 109 further out of inner bore 183. The ability of second arm 109 to slide in and out of first arm 105 preferably provides second arm 109 with a single degree of freedom preferably comprising at least one first translation 110, as shown. The length of first telescoping arm 175 preferably may be temporarily locked preferably by means of first knob 179, as shown.

First knob 179 preferably comprises threads 182, which preferably engage with a threaded bore within first arm 105, and which preferably advance first knob 179 further inside first arm 105 preferably with each clockwise turn. First telescoping arm 175 will preferably be temporally locked by advancing first knob 179 further inside first arm 105 preferably with clockwise turns preferably until first knob 179 makes firm contact with second arm 109. Preferably, the friction of first knob 179 pressing against second arm 109 keeps second arm 109 locked in place relative to first arm 105, as shown. The above-described arrangement at least herein embodies wherein said proximal portion is movably connectable to said distal portion by exactly one telescoping joint. Second telescopic joint 115 and third telescopic joint 123 are preferably similarly constructed (not shown). Upon reading this specification, those with ordinary skill in the art will now appreciate that, under appropriate circumstances, considering such issues as design preference, user preferences, marketing preferences, cost, structural requirements, available materials, technological advances, etc., other arm arrangements such as, for example, non-telescopic arms, straight arms, dual-arm arrangements, etc., may suffice.

Figure 8:
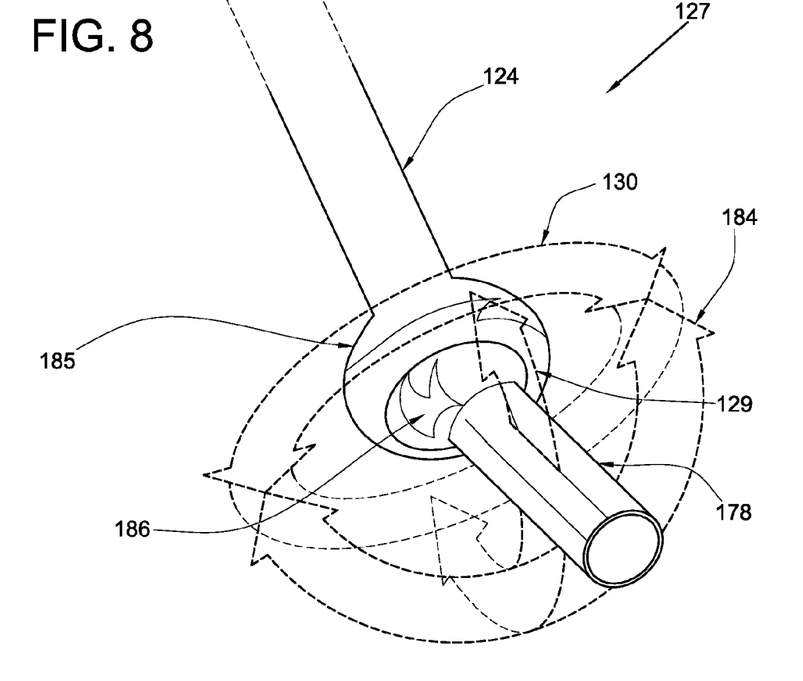
FIG. 8 shows a perspective view of an omni-directional positioner, illustrating the kinematics of the omni-directional positioner, according to the preferred embodiment of FIG. 4.

FIG. 8 shows a perspective view of an omni-directional positioner, illustrating the kinematics of the omni-directional positioner, according to the preferred embodiment of FIG. 4. In the preferred embodiment of FIG. 8, the omni-directional positioner comprises ball joint 127 (at least herein embodying at least one omni-directional joint), which preferably is an omni-directional joint with omni-directional capability.

Omni-directional capability preferably comprises second rotation 129, third articulation 130 and fourth articulation 184 of distal shaft 178 about ball joint 127, according to a preferred embodiment of the present invention. Ball joint 127 preferably comprises sixth arm 124, at least one hemispherical shell 185, at least one ball 186 and distal shaft 178, as shown. Sixth arm 124 preferably is permanently and rigidly connected with hemispherical shell 185, as shown. Ball 186 is preferably permanently and rigidly connected with distal shaft 178, as shown. Ball 186 is preferably housed within hemispherical shell 185 preferably such that it is free to rotate about any axis, but is preferably constrained from all translational movement. The ability of ball 186 to rotate about any axis preferably provides ball 186 with three degrees of freedom preferably comprising at least one second rotation 129, at least one third articulation 130 and at least one fourth articulation 184, as shown.

Lens compartment 132 preferably is rigidly connected to distal shaft 178. Distal shaft 178 preferably is rigidly attached to ball 186. Ball 186 preferably moves freely within hemispherical shell 185. Hemispherical shell 185 preferably is rigidly connected to third telescoping arm 177. In this manner, lens compartment 132 preferably is movably connected with third telescoping arm 177 preferably by means of ball joint 127. The above-described arrangement at least herein embodies wherein said omni-directional joint movably connects said lens holder with said articulating arm.

Depending upon whether said omni-directional positioner comprises ball joint 127, which preferably is rotatable about three axes, or a universal joint, which preferably is rotatable about two axes, lens compartment 132 will be rotatable about at least two axes relative to third telescoping arm 177. The above-described arrangement at least herein embodies wherein said omni-directional joint assists said lens holder in rotating about at least two axes relative to said articulating arm.

Upon reading this specification, those with ordinary skill in the art will now appreciate that, under appropriate circumstances, considering such issues as design preference, user preferences, marketing preferences, cost, structural requirements, available materials, technological advances, etc., other omni-directional positioner arrangements such as, for example, universal joints comprising only two degrees of freedom, etc., may suffice.

Figures 9, 10:
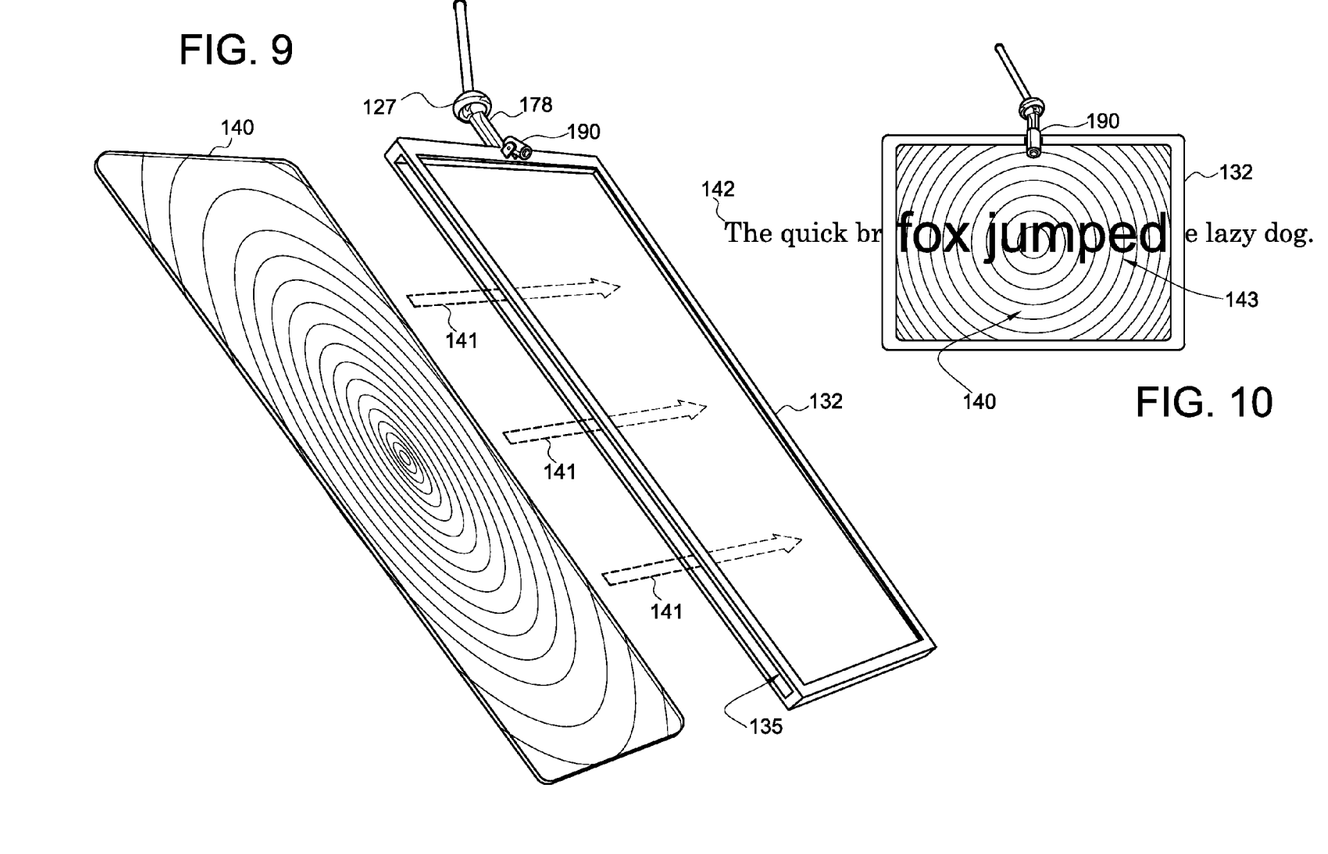
FIG. 9 shows a perspective view of a lens and lens compartment, illustrating the lens being inserted within the lens compartment according to another preferred embodiment the present invention.
FIG. 10 shows a frontal view of a lens, illustrating the magnification of text by the lens, according to another preferred embodiment of the present invention.

FIG. 9 shows a perspective view of lens 140 and lens compartment 132, illustrating lens 140 being inserted within lens compartment 132 according to another preferred embodiment of the present invention. In at least one preferred embodiment, distal shaft 178 of ball joint 127 is preferably permanently and rigidly attached directly to lens compartment 132, as shown, rather than to second clamp 131. The above-described arrangement at least herein embodies wherein said shaft is rigidly and permanently connected to said lens compartment.

Lens compartment 132 preferably comprises at least one inner compartment 135, as shown. Depending on the vision requirements of the user, lens 140 (comprising any desired focus) preferably may be inserted within lens compartment 132 along at least one lens insertion path 141, as shown (at least embodying herein wherein said lens compartment is structured and arranged to interchangeably receive and hold assorted lenses).

Lens compartment 132 preferably further comprises at least one light 190, as shown. Light 190 preferably is movably connected to lens compartment 132, preferably by at least one hinge, preferably assisting light 190 to articulate about at least one axis. Light 190 preferably assists with the illumination of at least one keyboard (not shown) thereby reducing eye strain when lighting conditions are poor.

FIG. 10 shows a frontal view of lens 140, illustrating the magnification of text 142 by lens 140 according to another preferred embodiment of the present invention. When removably inserted within lens compartment 132, lens 140 (at least embodying herein at least one lens structured and arranged to magnify at least one image upon at least one LCD monitor) preferably magnifies any viewed image, such as at least one text 142, preferably creating a magnified image, such as at least one magnified text 143, as shown.

The dimensions of lens 140 comprise a width, preferably at least 10¼ inches, and a height, preferably at least 7¾ inches. The aspect ratio of width to height is preferably about 4W to about 3H (4:3). The preferred geometry of lens 140 allows a user to view an image located anywhere upon on digital screen 189 of LCD monitor 100 without requiring any additional adjustment to the position or orientation of lens 140. The lens preferably comprises at least one anti-glare coating, preferably comprising an ultra-violet light filter. The lens preferably comprises a magnification factor of 2×, 4×, 6× to 16× or higher. Upon reading this specification, those with ordinary skill in the art will now appreciate that, under appropriate circumstances, considering such issues as design preference, user preferences, marketing preferences, cost, structural requirements, available materials, technological advances, etc., other magnification arrangements such as, for example, digital magnification, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A magnifying system comprising:
a) at least one magnifier lens structured and arranged to magnify at least one image upon at least one LCD monitor;
b) at least one omni-directional lens positioner structured and arranged to position said lens in at least one orientation rotatable about at least two axes;
c) at least one articulating arm structured and arranged to support said omni-directional lens positioner at one or more locations; and
d) at least one interchangeable support structured and arranged to support said articulating arm;
e) wherein said magnifier lens is supported in an upright position by said interchangeable support;
f) wherein said lens comprises
  i) at least one width no less than 10¼ inches, and
  ii) at least one height no less than 7¾ inches;
g) wherein said omni-directional lens positioner comprises
  i) at least one lens holder,
  ii) at least one omni-directional joint;
h) wherein said omni-directional joint movably connects said lens holder to said articulating arm;
i) wherein said omni-directional joint assists said lens holder in rotating about at least two axes relative to said articulating arm;
j) wherein said at least one articulating arm comprises at least two straight arms;
k) wherein each of said at least one straight arms is movably connected to at least one other straight arm by exactly one articulating joint;

l) wherein said articulating joint assists with at least one rotation about exactly one axis; and m) wherein said articulating joint comprises
   i) exactly one first crown gear comprising exactly one first axis of rotation and at least one first plurality of teeth, and
   ii) exactly one second crown gear comprising exactly one second axis of rotation and at least one second plurality of teeth,
   iii) wherein said first axis of rotation is coaxial with said second axis of rotation,
   iv) wherein said first plurality of teeth of said first crown gear is structured and arranged to engage with said second plurality of teeth of said second crown gear,
   v) wherein at least one said straight arm is rigidly and radially connected to said first crown gear comprising at least one first rotatable arm,
   vi) wherein at least one said straight arm is rigidly and radially connected to said second crown gear comprising at least one second rotatable arm, and
   vii) wherein said first rotatable arm will rotate relative to said second rotatable arm about said first and second axes of rotation when provided a user selected amount of torque.

2. The magnifying system of claim 1 wherein said lens holder comprises:
   a) at least one shaft;
   b) wherein said shaft is rigidly and permanently connected to said at least one magnifier lens.

3. The magnifying system of claim 1 wherein said lens holder comprises:
   a) at least one shaft; and
   b) at least one lens compartment;
   c) wherein said shaft is rigidly and permanently connected to said lens compartment; and
   d) wherein said lens compartment is structured and arranged to interchangeably receive and hold assorted lenses.

4. The magnifying system of claim 1 wherein said at least one lens holder comprises:
   a) at least one shaft;
   b) at least one lens compartment; and
   c) at least one second clamp;
   d) wherein said at least one shaft is structured and arranged to rigidly removably connect with said at least one second clamp;
   e) wherein said at least one second clamp is structured and arranged to rigidly removably connect with said at least one lens compartment;
   f) wherein said at least one lens compartment is structured and arranged to interchangeably receive and hold exactly one magnifier lens at a time; and
   g) wherein said at least one magnifier lens is selected from at least one assortment of magnifier lenses.

5. The magnifying system of claim 1 wherein said omni-directional joint comprises exactly one ball joint.

6. The magnifying system of claim 1 wherein said omni-directional joint comprises exactly one universal joint.

7. The magnifying system of claim 1 wherein said interchangeable support comprises:
   a) at least one first clamp;
   b) wherein said first clamp is structured and arranged to removably connect with said articulating arm in a substantially rigid manner;
   c) wherein said first clamp is structured and arranged to removably connect with exactly one edge of exactly one LCD monitor; and
   d) wherein said first clamp is structured and arranged to support said magnifying system upon said edge of said LCD monitor.

8. The magnifying system of claim 1 wherein said interchangeable support comprises:
   a) at least one base;
   b) wherein said at least one base is structured and arranged to removably connect with said at least one articulating arm in a substantially rigid manner;
   c) wherein said at least one base comprises at least one bottom surface; and
   d) wherein said at least one bottom surface comprises at least one area sufficiently large to support said magnifier lens in a substantially upright position.

9. The magnifying system of claim 1 wherein said straight arms comprise telescoping arms further comprising:
   a) at least one proximal portion;
   b) at least one distal portion; and
   c) at least one telescoping joint;
   d) wherein said at least one proximal portion is coaxial to said at least one distal portion; and
   e) wherein said at least one proximal portion is movably connectable to said at least one distal portion by exactly one telescoping joint.

10. The magnifying system of claim 1 wherein said arms comprise at least one lightweight plastic material.

11. A magnifying system comprising:
   a) at least one magnifier lens structured and arranged to magnify at least one image upon at least one LCD monitor wherein said at least one magnifier lens comprises
      i) at least one width no less than 10¼ inches, and
      ii) at least one height no less than 7¾ inches;
   b) at least one omni-directional lens positioner structured and arranged to position said at least one magnifier lens in at least one orientation rotatable about at least two axes wherein said at least one omni-directional positioner comprises
      i) at least one lens holder, and
      ii) at least one omni-directional joint;
   c) at least one articulating arm structured and arranged to movably support said at least one omni-directional lens positioner at one or more locations; and
   d) at least one interchangeable support structured and arranged to rigidly support said at least one articulating arm in a substantially upright position;
   e) wherein said at least one articulating arm comprises
      i) at least two straight arms, and
      ii) at least one articulating joint,
      iii) wherein said at least two straight arms are movably connected to each other by said at least one articulating joint;
   f) wherein each said at least one articulating joint assists with at least one rotation about exactly one axis;
   g) wherein said at least one omni-directional joint movably connects said at least one lens holder with said at least one articulating arm;
   h) wherein said at least one omni-directional joint assists said at least one lens holder in rotating about at least two axes relative to said at least one articulating arm; and
   i) wherein said at least one articulating joint comprises
      i) exactly one first crown gear comprising exactly one first axis of rotation and at least one first plurality of teeth, and
      ii) exactly one second crown gear comprising exactly one second axis of rotation and at least one second plurality of teeth, iii) wherein said first axis of rotation is coaxial with said second axis of rotation,
iv) wherein said first plurality of teeth of said first crown gear is structured and arranged to engage with said second plurality of teeth of said second crown gear,
v) wherein at least one straight arm is rigidly and radially connected to said first crown gear comprising at least one first rotatable arm,
vi) wherein at least one of said at least two straight arms is rigidly and radially connected to said second crown gear comprising at least one second rotatable arm, and
vii) wherein said at least one first rotatable arm will rotate relative to said at least one second rotatable arm about said first and second axes of rotation when provided a user-selected amount of torque.

12. The magnifying system of claim 11 wherein said at least one lens holder comprises:
a) at least one shaft;
b) at least one lens compartment;
c) at least one light;
d) wherein said at least one light is movably connected to said at least one lens compartment;
e) wherein said at least one shaft is rigidly and permanently connected to said at least one lens compartment; and
f) wherein said at least one lens compartment is structured and arranged to interchangeably receive and hold exactly one magnifier lens.

13. The magnifying system of claim 11 wherein said lens holder comprises:
a) at least one shaft;
b) at least one lens compartment;
c) at least one second clamp;
d) wherein said at least one shaft is structured and arranged to rigidly removably connect with said second clamp;
e) wherein said second clamp is structured and arranged to rigidly removably connect with said lens compartment; and
f) wherein said at least one lens compartment is structured and arranged to interchangeably receive and hold exactly one magnifier lens.

14. The magnifying system of claim 11 wherein said at least one interchangeable support comprises:
a) at least one first clamp;
b) wherein said at least one first clamp is structured and arranged to removably connect with said at least one articulating arm in a substantially rigid manner;
c) wherein said at least one first clamp is structured and arranged to removably connect with exactly one edge of exactly one LCD monitor; and,
d) wherein said at least one first clamp is structured and arranged to support said at least one magnifier lens upon said edge of said LCD monitor.

15. The magnifying system of claim 11 wherein said at least one interchangeable support comprises:
a) at least one base;
b) wherein said at least one base is structured and arranged to removably connect with said at least one articulating arm in a substantially rigid manner;
c) wherein said at least one base comprises at least one bottom surface; and
d) wherein said at least one bottom surface comprises at least one area sufficiently large to support said at least one magnifier lens in a substantially upright position.

16. The magnifying system of claim 11 wherein said straight arms comprise telescoping arms further comprising:
a) at least one proximal portion;
b) at least one distal portion; and
c) at least one telescoping joint;
d) wherein said at least one proximal portion is coaxial to said at least one distal portion; and,
e) wherein said at least one proximal portion is movably connectable to said at least one distal portion by exactly one telescoping joint.

* * * * *